(12) United States Patent
Lyu et al.

(10) Patent No.: US 9,743,385 B2
(45) Date of Patent: Aug. 22, 2017

(54) DATA SENDING AND RECEIVING METHOD AND DEVICE

(71) Applicant: Huawei Technologies Co., Ltd., Shenzhen (CN)

(72) Inventors: Yongxia Lyu, Beijing (CN); Tong Ji, Beijing (CN); Wen Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 63 days.

(21) Appl. No.: 14/838,623

(22) Filed: Aug. 28, 2015

(65) Prior Publication Data

US 2015/0373673 A1    Dec. 24, 2015

Related U.S. Application Data

(63) Continuation of application No. PCT/CN2013/072023, filed on Feb. 28, 2013.

(51) Int. Cl.
*H04W 12/06* (2009.01)
*H04W 72/04* (2009.01)
(Continued)

(52) U.S. Cl.
CPC ........... *H04W 72/04* (2013.01); *H04L 5/0044* (2013.01); *H04L 27/2607* (2013.01); *H04L 47/00* (2013.01)

(58) Field of Classification Search
None
See application file for complete search history.

(56) References Cited

U.S. PATENT DOCUMENTS 6,823,005 B1    11/2004  Chuang et al.
2006/0079257 A1    4/2006  Iochi et al.
(Continued)

FOREIGN PATENT DOCUMENTS

CN    101132327 A    2/2008
CN    101141375 A    3/2008
(Continued)

OTHER PUBLICATIONS

"3$^{rd}$ Generation Partnership Project; Technical Specification Group Radio Access Network; Evolved Universal Terrestrial Radio Access (E-UTRA) Medium Access Control (MAC) protocol specification (Release 8)," 3GPP TS 36.321, V8.4.0, pp. 1-43, 3$^{rd}$ Generation Partnership Project, Valbonne, France (Dec. 2008).

(Continued)

*Primary Examiner* — Brandon Renner
(74) *Attorney, Agent, or Firm* — Leydig, Voit & Mayer, Ltd.

(57) ABSTRACT

Embodiments of the present invention provide a data sending and receiving method and device. The method includes: receiving a threshold; if a data volume of a packet to be sent is less than the threshold, sending the packet in a first data transmission manner; and if a data volume of the packet is greater than or equal to the threshold, sending the packet in a second data transmission manner. By adopting the technical solution of the present invention, a resource waste caused by transmitting small data in a data transmission manner used for transmitting a large packet in the prior art can be reduced, transmission efficiency of small data can be improved, and a transmission delay can be reduced.

10 Claims, 3 Drawing Sheets

(51) Int. Cl.
*H04L 12/70* (2013.01)
*H04L 5/00* (2006.01)
*H04L 27/26* (2006.01)

(56) References Cited

U.S. PATENT DOCUMENTS

| | | | | |
|---|---|---|---|---|
| 2008/0304446 | A1* | 12/2008 | Kimura | H04L 5/0046 370/329 |
| 2009/0172119 | A1 | 7/2009 | Eriksson | |
| 2011/0116560 | A1* | 5/2011 | Mueck | H04L 1/0606 375/260 |
| 2013/0066951 | A1* | 3/2013 | Agranat | H04J 14/0227 709/203 |
| 2013/0189941 | A1* | 7/2013 | Abbott | H04W 4/021 455/404.1 |
| 2013/0196606 | A1* | 8/2013 | Brown | H04W 52/367 455/73 |
| 2014/0113656 | A1* | 4/2014 | Schmidt | H04W 24/10 455/456.2 |
| 2015/0103766 | A1* | 4/2015 | Miklos | H04W 72/042 370/329 |

FOREIGN PATENT DOCUMENTS

| | | |
|---|---|---|
| CN | 101283555 A | 12/2008 |
| CN | 101645731 A | 2/2010 |
| CN | 101764746 A | 6/2010 |
| CN | 102833750 A | 12/2012 |
| JP | 2004297284 A | 10/2004 |
| JP | 2009177282 A | 8/2009 |

OTHER PUBLICATIONS

Koraitim et al., "Resource Allocation and Connection Admission Control in Satellite Networks," IEEE Journal on Selected Areas in Communications, vol. 17, Issue 2, pp. 360-372, Institute of Electrical and Electronics Engineers, New York, New York (Feb. 1999).

* cited by examiner

DATA SENDING AND RECEIVING METHOD AND DEVICE

CROSS-REFERENCE

This application is a continuation of International Patent Application No. PCT/CN2013/072023, filed on Feb. 28, 2013, which is hereby incorporated by reference in its entirety.

TECHNICAL FIELD

Embodiments of the present invention relate to a communications technology, and in particular, to a data sending and receiving method and device.

BACKGROUND

In an existing Long Term Evolution (Long Term Evolution, LTE for short) system, uplink data transmission is based on connections, that is, if a user equipment (User Equipment, UE for short) needs to perform data transmission, the user equipment needs to implement uplink synchronization by random access first, and then establish a radio resource control (Radio Resource Control, RRC) connection and a radio bearer, and only after that can the user equipment implement data transmission.

In machine to machine (Machine to machine, M2M for short) communications, there are a large number of small packet services. If an existing data transmission manner is adopted, an overhead of more than 10 pieces of signaling is required for transmitting a piece of small data. This not only leads to a waste of resources, but also results in a large transmission delay and rather low transmission efficiency.

SUMMARY

Embodiments of the present invention provide a data sending and receiving method and device, to reduce a resource waste caused by transmission of small data, improve transmission efficiency of small data, and reduce a transmission delay.

A first aspect provides a data sending method, including:
receiving a threshold;
if a data volume of a packet to be sent is less than the threshold, sending the packet in a first data transmission manner; and
if a data volume of the packet is greater than or equal to the threshold, sending the packet in a second data transmission manner.

A second aspect provides a data receiving method, including:
determining a transmission resource for a packet that is sent by a user equipment and is detected;
if a data transmission manner corresponding to the determined transmission resource is a first data transmission manner, receiving the packet in the first data transmission manner; and
if a data transmission manner corresponding to the determined transmission resource is a second data transmission manner, receiving the packet in the second data transmission manner.

A third aspect provides a user equipment, including:
a receiving module, configured to receive a threshold; and
a sending module, configured to: when a data volume of a packet to be sent is less than the threshold, send the packet in a first data transmission manner; or when a data volume of the packet is greater than or equal to the threshold, send the packet in a second data transmission manner.

A fourth aspect provides a user equipment, including:
a memory, configured to store a program;
a processor, configured to execute the program; and
a communications interface, configured to receive a threshold, and when a data volume of a packet to be sent is less than the threshold, send the packet in a first data transmission manner; or when a data volume of the packet is greater than or equal to the threshold, send the packet in a second data transmission manner.

A fifth aspect provides a network side device, including:
a determining module, configured to determine a transmission resource for a packet that is sent by a user equipment and is detected; and
a receiving processing module, configured to: when a data transmission manner corresponding to the determined transmission resource is a first data transmission manner, receive the packet in the first data transmission manner; or when a data transmission manner corresponding to the determined transmission resource is a second data transmission manner, receive the packet in the second data transmission manner.

A sixth aspect provides a network side device, including:
a memory, configured to store a program; and
a processor, configured to execute the program, so as to determine a transmission resource for a packet that is sent by a user equipment and is detected, and when a data transmission manner corresponding to the determined transmission resource is a first data transmission manner, receive the packet in the first data transmission manner; or when a data transmission manner corresponding to the determined transmission resource is a second data transmission manner, receive the packet in the second data transmission manner.

According to the data sending and receiving method and device provided in the embodiments of the present invention, when a user equipment needs to send a packet, the user equipment compares a data volume of the packet with a received threshold, to determine whether the packet to be sent is a large data packet or a small data packet; when the data volume of the packet to be sent is less than the threshold, regards the packet to be sent as a small data packet, and sends the packet in a first data transmission manner; and when the data volume of the packet to be sent is greater than or equal to the threshold, regards the packet to be sent as a large data packet, and sends the packet in a second data transmission manner, thereby adopting different data transmission manners for packets of different sizes; and a network side device receives the packet in different data transmission manners, thereby solving problems caused by sending a small packet in a data transmission manner used for sending a large packet in the prior art, such as a resource waste, a relatively great transmission delay, and relatively low transmission efficiency.

BRIEF DESCRIPTION OF DRAWINGS

To describe the technical solutions in the embodiments of the present invention or in the prior art more clearly, the following briefly introduces accompanying drawings required for describing the embodiments or the prior art. Apparently, the accompanying drawings in the following description show merely some embodiments of the present invention, and a person of ordinary skill in the art may still derive other drawings according to these accompanying drawings without creative efforts.

DESCRIPTION OF EMBODIMENTS

Figure 1:
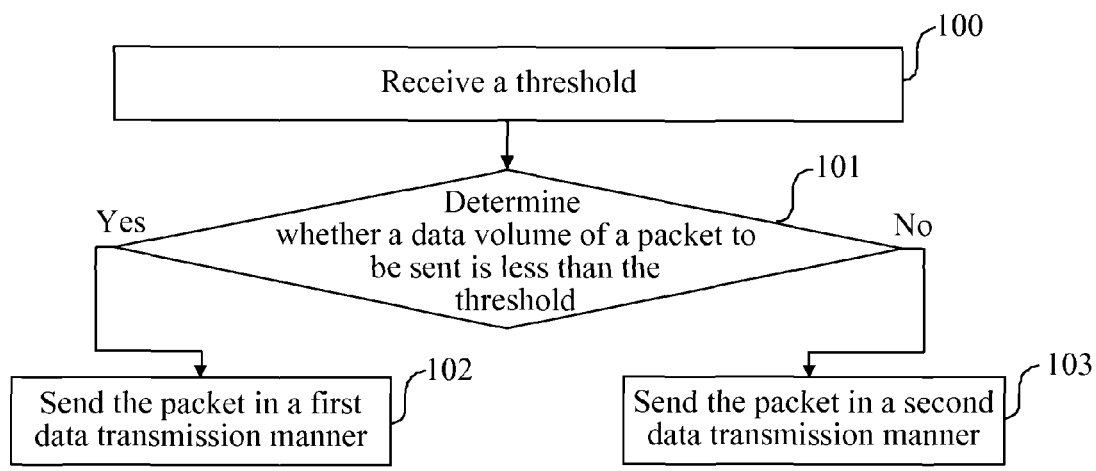
FIG. 1 is a flowchart of a data sending method according to an embodiment of the present invention.

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

To solve problems caused by transmitting small data in an M2M communication scenario in a connection-based data transmission manner in the prior art, such as a resource waste, a relatively great transmission delay, and relatively low transmission efficiency, an embodiment of the present invention provides a data transmission method, including: receiving, by a UE, a threshold; when a packet needs to be sent, determining whether a data volume of the packet to be sent is less than the threshold; if a result of the determining is yes, that is, the data volume of the packet to be sent is less than the threshold, sending the packet in a first data transmission manner; and if a result of the determining is no, sending the packet in a second data transmission manner; and correspondingly, determining, by a network side device, a transmission resource for a packet that is sent by a UE and is detected; if a data transmission manner corresponding to the determined transmission resource is a first data transmission manner, receiving the packet in the first data transmission manner; and if a data transmission manner corresponding to the determined transmission resource is a second data transmission manner, receiving the packet in the second data transmission manner. The threshold is mainly used to measure whether the packet to be sent is a small data packet, and may be entered by an operator, that is, the threshold may be set by a system, or may be periodically delivered by the network side device by using a broadcast message, or may be delivered by the network side device by using dedicated signaling. A specific value of the threshold may be set according to an actual application scenario, and is not limited in the embodiment of the present invention. The network side device mainly refers to a base station, but is not limited thereto.

In the embodiment of the present invention, the second data transmission manner mainly refers to a data transmission manner defined by any release of LTE release 8 to LTE release 11, and the second data transmission manner is usually a manner in which data transmission can be performed only after uplink synchronization is implemented by random access and an RRC connection and a radio bearer are established, that is, a connection-based data transmission manner. Correspondingly, in the embodiment of the present invention, the first data transmission manner mainly refers to a data transmission manner defined by a release other than LTE Release 8 to LTE Release 11, and mainly refers to a manner in which data transmission can be performed without executing at least one of the operations of implementing uplink synchronization by random access, establishing an RRC connection, and establishing a radio bearer.

It can be seen from the above that, in the data sending method provided in the embodiment of the present invention, small data is sent based on the first data transmission manner, while a large data is sent in the second data transmission manner, which means different data transmission manners are provided for transmitting large data and small data. Unlike the prior art in which data can be sent only after uplink synchronization is implemented by random access and an RRC connection and a radio bearer are established, the first data transmission manner used for transmitting small data can reduce a signaling overhead, help to save resources, reduce a transmission delay, and improve transmission efficiency; and meanwhile, the second data transmission manner can ensure successful transmission of large data.

FIG. 1 is a flowchart of a data sending method according to an embodiment of the present invention. As shown in FIG. 1, the method in this embodiment includes:

Step 100: Receive a threshold.

Step 101: Determine whether a data volume of a packet to be sent is less than the threshold; if a result of the determining is yes, that is, the data volume of the packet is less than the threshold, it can be regarded that the packet is a small data packet, and step 102 is performed; otherwise, if a result of the determining is no, that is, the data volume of the packet is greater than or equal to the threshold, it can be regarded that the packet is a large data packet, and step 103 is performed.

Step 102: Send the packet in a first data transmission manner.

Step 103: Send the packet in a second data transmission manner.

In this implementation manner, a UE receives in advance a threshold for measuring a size of a packet to be sent, for example, the threshold may be, but is not limited to, 50 bytes (byte). When the UE needs to send an uplink packet, the UE first checks a data volume of the packet to be sent; if the data volume of the packet is greater than or equal to the threshold, the UE regards that the packet to be sent is a large data packet, and a connection-based data transmission method should be adopted, that is, the UE first implements uplink synchronization by random access, then establishes an RRC connection and a radio bearer, and afterwards transmits the packet; and if the data volume of the packet to be sent is less than the threshold, the UE regards that the packet to be sent is a small data packet, and a first data transmission manner may be adopted, so as to save resources, reduce a transmission delay, and improve transmission efficiency. The threshold may be set by a system, broadcast by the system, or informed by using dedicated signaling.

The step 100 of receiving information carrying a threshold for indicating whether the data volume is large or small includes: receiving the threshold which is sent by a network side device by using a first broadcast message; or receiving the threshold which is sent by a network side device by using first dedicated signaling; or receiving the threshold entered by an operator. The operator herein may be a user of the UE or another person. By using a man-machine interface provided by the UE, the operator sets the threshold in the UE in advance. This manner is one implementation manner of presetting the threshold by the system, but the manner of presetting the threshold by the system is not limited thereto. The first broadcast message herein is a type of broadcast message, and the first dedicated signaling is a type of dedicated signaling. In order to distinguish the two from a broadcast message and dedicated signaling described below, the broadcast message and the dedicated signaling herein are each named starting with "first".

Optionally, in the embodiment of the present invention, the UE may receive the threshold each time the UE sends data, or the UE may receive a new threshold only when the threshold changes, and the UE uses the previously received threshold all the time if the threshold does not change.

In a case that the first data transmission manner and the second data transmission manner coexist, transmission resources in the two data transmission manners may be multiplexed. For example, a multiplexing manner for a transmission resource used in the first data transmission manner and a transmission resource used in the second data transmission manner may be frequency division multiplexing, time division multiplexing, time-frequency division multiplexing, space division multiplexing, or the like. Optionally, the network side device may notify, by broadcasting or by using dedicated signaling, the UE of the transmission resource used in the second data transmission manner and the transmission resource used in the first data transmission manner. Specifically, before the sending the packet in a first data transmission manner or a second data transmission manner, the method may further include: receiving a mapping, which is sent by the network side device by using a second broadcast message or second dedicated signaling, between the transmission resources and the data transmission manners. Once which data transmission manner is used to transmit a packet is determined, a transmission resource used for transmitting the packet is determined. Based on this, the sending, by the UE, the packet in a first data transmission manner includes: determining, according to the mapping, the transmission resource corresponding to the first data transmission manner, and sending, on the determined transmission resource, the packet in the first data transmission manner; and correspondingly, the sending, by the UE, the packet in a second data transmission manner includes: determining, according to the mapping, the transmission resource corresponding to the second data transmission manner, and sending, on the determined transmission resource, the packet in the second data transmission manner. Similarly, the second broadcast message is a type of broadcast message, and the second dedicated signaling is a type of dedicated signaling. In order to distinguish the two from the broadcast message and the dedicated signaling described above, the broadcast message and the dedicated signaling are each named starting with "second".

In the embodiment of the present invention, a data format used in the second data transmission manner is: cyclic prefix (Cyclic Prefix, CP for short)+one OFDM symbol+guard time (Guard Time, GT for short).

In the embodiment of the present invention, a data format used in the first data transmission manner sequentially includes an information code word field, at least one OFDM symbol formed by the packet to be sent, and a GT, which may be expressed more directly as information code word field+data part+GT, where the data part is the at least one OFDM symbol formed by the packet to be sent, and the information code word field is used to indicate a start position of the data part (that is, the at least one OFDM symbol).

Optionally, the information code word field may include a CP. A duration of the CP included in the information code word field is greater than or equal to a sum of the double of a propagation delay and a maximum multipath delay spread in a current transmission environment. It can be seen that the CP in the data format used in the first data transmission manner is greater than or equal to the duration of the CP in the data format used in the second data transmission manner, and therefore, the CP in the data format used in the first data transmission manner may be referred to as a large CP.

Optionally, the GT in the data format used in the first data transmission manner is greater than the double of the propagation delay in the current transmission environment.

Optionally, if the multiplexing manner for the transmission resource used in the first data transmission manner and the transmission resource used in the second data transmission manner includes the frequency division multiplexing, for example, a frequency division multiplexing manner is adopted for the transmission resource used in the first data transmission manner and the transmission resource used in the second data transmission manner, or a time-frequency division multiplexing manner is adopted for the transmission resource used in the first data transmission manner and the transmission resource used in the second data transmission manner, a duration of the OFDM symbol in the data format used in the first data transmission manner is an integral multiple of a duration of the OFDM symbol in the data format used in the second data transmission manner.

Based on the data format used in the first data transmission manner, a process of sending, by the UE, the packet in the first data transmission manner includes: modulating the packet into at least one OFDM symbol; mapping, according to the data format used in the first data transmission manner, the at least one OFDM symbol obtained by modulation to the transmission resource used in the first data transmission manner, and sending the OFDM symbol.

It can be seen from the above that, in this embodiment, when a UE needs to send a packet, the UE compares a data volume of the packet with a threshold, to determine whether the packet to be sent is a large data packet or a small data packet; when the data volume of the packet to be sent is less than the threshold, the UE regards the packet to be sent as a small data packet, and sends the packet in a first data transmission manner; and when the data volume of the packet to be sent is greater than or equal to the threshold, the UE regards the packet to be sent as a large data packet, and adopts a second data transmission manner, thereby not only solving the problems caused by sending a small packet in the second data transmission manner, such as a resource waste, a relatively great transmission delay, and relatively low transmission efficiency, but also achieving transmission of some large packets in M2M communications, for example, transmission of video and entertainment information in video surveillance and telematics, and moreover, satisfying requirements of a service requiring transmission of a large packet and a service requiring transmission of a small packet.

With reference to the multiplexing manner for the transmission resources used in the two data transmission manners, the following describes the data format used in the first data transmission manner by using an example.

Figure 2:
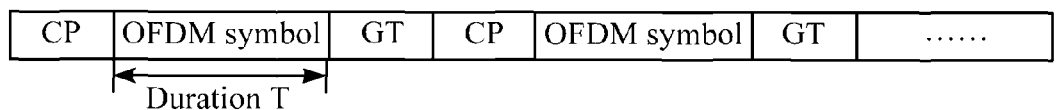
FIG. 2 is a schematic diagram of a data format used in a second data transmission manner according to an embodiment of the present invention.
Figure 3:
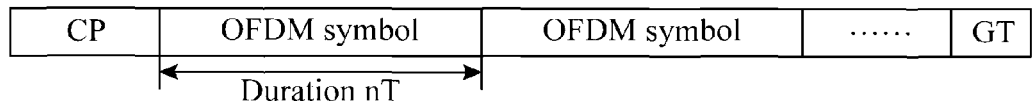
FIG. 3 is a schematic diagram of a data format used in a first data transmission manner according to an embodiment of the present invention.

For example, a method of frequency division may be adopted for the transmission resource used in the first data transmission manner and the transmission resource used in the second data transmission manner, that is, some system spectrum resources are used for the first data transmission manner, and other system spectrum resources are used for the second data transmission manner. Based on this, a data format of the first data transmission manner may be set in a form of large CP+one or more large OFDM symbols+GT, where the large CP herein may be obtained from the last part of the OFDM symbol. The CP in the data format used in the first data transmission manner is referred to as a large CP because compared with a CP used in the second data transmission manner, the CP in the data format used in the first data transmission manner is larger than the CP in a data format used in the second data transmission manner. FIG. 2 shows the data format used in the second data transmission manner, and FIG. 3 shows the data format used in the first data transmission manner. The large CP herein is one specific implementation manner of the information code word field.

In order to cope with the double of a propagation delay and a maximum multipath delay spread, the CP in FIG. 3 is greater than or equal to the sum of the double of the propagation delay and the maximum multipath delay spread in a current transmission environment. In order to reduce as much as possible a ratio of a resource overhead spent on the CP to an overhead of the whole data part, a duration of one OFDM symbol in the data format used in the first data transmission manner is greater than a duration of one OFDM symbol in the data format used in the second data transmission manner. Besides, a frequency division multiplexing manner is adopted for the transmission resources used in the two data transmission manners. In order to maintain orthogonality between frequency resources of a user who uses the two data transmission manners and reduce interference between the frequency resources, the duration of the OFDM symbol in the data format used in the first data transmission manner may preferably be an integral multiple of the duration of the OFDM symbol in the data format used in the second data transmission manner. The GTs in the data formats used in the two data transmission manners are set for a purpose of reducing interference between adjacent data subframes.

For example, it is assumed that the threshold for determining whether the packet is a large data packet or a small data packet is 50 bytes, a subcarrier spacing used in the second data transmission manner is 15 KHz, and a subcarrier spacing used in the first data transmission manner is 2.5 KHz; 15/2.5=6, and 6 is an integer, which satisfies orthogonality between subcarriers used in the two data transmission manners. The duration of one OFDM symbol in the data format used in the first data transmission manner is six times the duration of one OFDM symbol in the data format used in the second data transmission manner, and durations of the CP and the GT used in the first data transmission manner are different from the durations of the CP and the GT used in the second data transmission manner. Besides, the data format used in the first data transmission manner also needs to satisfy that the duration of the CP plus the duration of one OFDM symbol plus the duration of the GT is an integral multiple of a timeslot. For example, if a timeslot is 500 μs, the sum of the foregoing durations needs to be an integral multiple of 500 μs, as illustrated in Table 1.

TABLE 1

| Threshold is 50 byte | Subcarrier spacing (Hz) | Duration of CP (μs) | Duration of OFDM symbol (μs) | Duration of GT (μs) |
| --- | --- | --- | --- | --- |
| First data transmission manner | 2.5K | 105 | 400 | 95 |
| Second data transmission manner | 15K | 5 | 66.7 | 5 |

The specific values of the threshold, subcarrier spacing, and duration of the OFDM symbol given in the foregoing Table 1 are examples used in the embodiment of the present invention, but the present invention is not limited to the described specific values. If the values are changed to other values, corresponding modifications can be made according to the foregoing corresponding principles.

For another example, a method of time division may be adopted for the transmission resource used in the first data transmission manner and the transmission resource used in the second data transmission manner, that is, all system bandwidths are used for the first data transmission manner during some time, and are used for the second data transmission manner during another time. Based on this, the data format used in the first data transmission manner is a format of information code word field+data (DATA) part+GT. The data format may specifically be a format of CP+at least one OFDM symbol+GT, or may be a format of preamble (preamble)+at least one OFDM symbol+GT, where the CP and the preamble herein are specific implantation manners of the information code word field, and may be used for timing and channel estimation of the data part (that is, the at least one OFDM symbol) next to the CP or the preamble, and may also implicitly carry some information.

For another example, a method of time-frequency division may be adopted for the transmission resource used in the first data transmission manner and the transmission resource used in the second data transmission manner, that is, some system bandwidths are used for the first data transmission manner during some time, and other time-frequency resources are used for the second data transmission manner during another time. Based on this, the data format used in the first data transmission manner may be a form of information code word field+data (DATA) part+GT, where the information code word field herein may be a single code, for example, a CP, where the CP herein provides a time synchronization function; or the information code word field may be in a form of CP+time synchronization code, where the CP+time synchronization code herein provides the time synchronization function.

Figure 4:
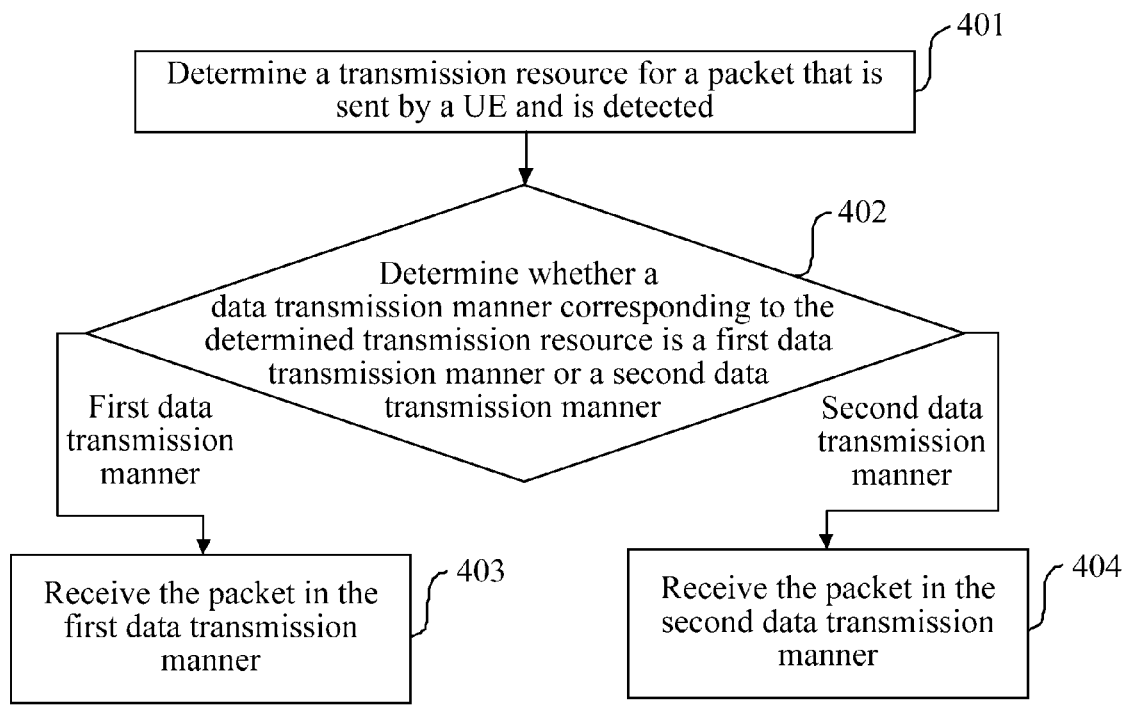
FIG. 4 is a flowchart of a data receiving method according to an embodiment of the present invention.

FIG. 4 is a flowchart of a data receiving method according to an embodiment of the present invention. As shown in FIG. 4, the data receiving method in this embodiment includes:

Step 401: Determine a transmission resource for a packet that is sent by a UE and is detected.

Step 402: Determine whether a data transmission manner corresponding to the determined transmission resource is a first data transmission manner or a second data transmission manner; if the data transmission manner corresponding to the determined transmission resource is the first data transmission manner, execute step 403; and if the data transmission manner corresponding to the determined transmission resource is the second data transmission manner, execute step 404.

Step 403: Receive the packet in the first data transmission manner.

Step 404: Receive the packet in the second data transmission manner.

In this embodiment, different data transmission manners are provided for receiving packets of different sizes. Besides, different data transmission manners are corresponding to different transmission resources. In other words, once a transmission resource is determined, it means that a data transmission manner in which the transmission resource is used is also determined; and once a data transmission manner is determined, it means that a transmission resource used in the data transmission manner is also determined.

In this embodiment, the data transmission manners may include but are not limited to the first data transmission manner and the second data transmission manner. For definitions of the first data transmission manner and the second data transmission manner, reference may be made to the description in the foregoing embodiment, which is not repeated herein.

A network side device performs detection on a transmission resource; when a packet sent by a UE is detected, the network side device determines a transmission resource used for sending the packet (that is, a transmission resource for the packet is detected); if the data transmission manner corresponding to the transmission resource is the first data transmission manner, the network side device receives the packet in the first data transmission manner; and if the data transmission manner corresponding to the transmission resource is the second data transmission manner, the network side device receives the packet in the second data transmission manner. Different data transmission manners are corresponding to different receiving processes. The receiving processes are not described in detail in the embodiment of the present invention.

In an optional implementation manner, before step 401, the method includes: sending a threshold to the UE by using a first broadcast message, so that the UE determines, according to a value relationship between a data volume of the packet and the threshold, the data transmission manner used for sending the packet; or sending a threshold to the UE by using first dedicated signaling, so that the UE determines, according to a value relationship between a data volume of the packet and the threshold, the data transmission manner used for sending the packet.

Besides the foregoing manners, the threshold may also be set by a system, that is, the network side device and the UE agree, in advance, on a threshold to be used. For example, for a UE, the threshold may be set in the UE by an operator.

For a detailed process of determining, by the UE according to the value relationship between the data volume of the packet and the threshold, the data transmission manner used for sending the packet, reference may be made to the description in the foregoing embodiment, which is not repeated herein.

In an optional implementation manner, before step 401, the method may further include: sending, by using a second broadcast message or second dedicated signaling, a mapping between the transmission resources and the data transmission manners to the UE, so that the UE determines, according to the mapping, the transmission resource used for transmitting the packet.

When the first data transmission manner and the second data transmission manner coexist, the transmission resources used in the first data transmission manner and the second data transmission manner may be multiplexed. For example, a multiplexing manner for the transmission resource used in the first data transmission manner and the transmission resource used in the second data transmission manner is frequency division multiplexing, time division multiplexing, time-frequency division multiplexing, or space division multiplexing.

In the embodiment of the present invention, a data format used in the second data transmission manner is: CP+one OFDM symbol+GT, as shown in FIG. 2.

In the embodiment of the present invention, a data format used in the first data transmission manner sequentially includes an information code word field, at least one OFDM symbol formed by the packet to be sent, and a GT, as shown in FIG. 3. The format may be expressed more directly as information code word field+data part+GT, where the data part is the at least one OFDM symbol formed by the packet to be sent, and the information code word field is used to indicate a start position of the data part (that is, the at least one OFDM symbol).

Optionally, the information code word field includes a CP, where the CP is greater than or equal to a sum of the double of a propagation delay and a maximum multipath delay spread in a current transmission environment. It can be seen that the CP in the data format used in the first data transmission manner is greater than or equal to the duration of the CP in the data format used in the second data transmission manner, and therefore, the CP in the data format used in the first data transmission manner may be referred to as a large CP.

Optionally, the GT in the data format used in the first data transmission manner is greater than the double of the propagation delay in the current transmission environment.

Optionally, if the multiplexing manner for the transmission resource used in the first data transmission manner and the transmission resource used in the second data transmission manner includes the frequency division multiplexing, for example, a frequency division multiplexing manner is adopted for the transmission resource used in the first data transmission manner and the transmission resource used in the second data transmission manner, or a time-frequency division multiplexing manner is adopted for the transmission resource used in the first data transmission manner and the transmission resource used in the second data transmission manner, a duration of the OFDM symbol in the data format used in the first data transmission manner is an integral multiple of a duration of the OFDM symbol in the data format used in the second data transmission manner.

As seen from above, in this embodiment, different data transmission manners are provided, and the different data transmission manners are distinguished from each other by using different transmission resources used in the different data transmission manners; when a packet arrives, by determining a transmission resource for the detected packet, the packet is received in a data transmission manner corresponding to the transmission resource, so that different packets can be received in different data transmission manners. Compared with a solution of transmitting a small packet in a data transmission manner used for transmitting a large packet in the prior art, this solution helps to reduce a resource waste, reduce a transmission delay, and improve transmission efficiency.

Figure 5:
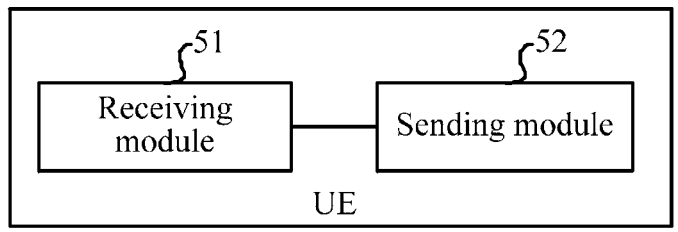
FIG. 5 is a schematic structural diagram of a UE according to an embodiment of the present invention.

FIG. 5 is a schematic structural diagram of a UE according to an embodiment of the present invention. As shown in FIG. 5, the UE includes: a receiving module 51 and a sending module 52.

The receiving module 51 is configured to receive a threshold, where the threshold is used to indicate whether a data volume is large or small.

The sending module 52 is connected to the receiving module 51, and is configured to: when a data volume of a packet to be sent is less than the threshold received by the receiving module 51, send the packet in a first data transmission manner; or when a data volume of the packet is greater than or equal to the threshold received by the receiving module 51, send the packet in a second data transmission manner.

In an optional implementation manner, a multiplexing manner for a transmission resource used in the first data transmission manner and a transmission resource used in the second data transmission manner is frequency division multiplexing, time division multiplexing, time-frequency division multiplexing, or space division multiplexing.

In an optional implementation manner, a data format used in the first data transmission manner sequentially includes an information code word field, at least one OFDM symbol formed by the packet, and a GT, where the information code word field is used to indicate a start position of the at least one OFDM symbol.

Optionally, the information code word field includes a CP, where the CP is greater than or equal to a sum of the double of a propagation delay and a maximum multipath delay spread in a current transmission environment.

Optionally, the GT in the data format used in the first data transmission manner is greater than the double of the propagation delay in the current transmission environment.

In an optional implementation manner, if the multiplexing manner for the transmission resource used in the first data transmission manner and the transmission resource used in the second data transmission manner includes the frequency division multiplexing, a duration of the OFDM symbol in the data format used in the first data transmission manner is an integral multiple of a duration of an OFDM symbol in a data format used in the second data transmission manner.

In an optional implementation manner, that the receiving module 51 is configured to receive the threshold includes that: the receiving module 51 is specifically configured to receive the threshold which is sent by a network side device by using a first broadcast message, or receive the threshold which is sent by a network side device by using first dedicated signaling, or receive the threshold entered by an operator.

In an optional implementation manner, the receiving module 51 is further configured to: before the sending module 52 sends the packet, receive a mapping which is between the transmission resources and the data transmission manners and is sent by the network side device by using a second broadcast message; or receive a mapping which is between the transmission resources and the data transmission manners and is sent by the network side device by using second dedicated signaling. Based on this, the sending module 52 may specifically be configured to: when the data volume of the packet is less than the threshold, determine, according to the mapping received by the receiving module 51, the transmission resource corresponding to the first data transmission manner, and send, on the determined transmission resource, the packet in the first data transmission manner; or when the data volume of the packet is greater than or equal to the threshold, determine, according to the mapping received by the receiving module 51, the transmission resource corresponding to the second data transmission manner, and send, on the determined transmission resource, the packet in the second data transmission manner.

The functional modules of the UE provided in this embodiment may be configured to execute the processes of the method embodiment shown in FIG. 1. The specific working principle of the UE is not repeated. For details, refer to the description in the method embodiment.

When a UE provided in this embodiment needs to send a packet, the UE compares a data volume of the packet with a threshold, to determine whether the packet to be sent is a large data packet or a small data packet; when the data volume of the packet to be sent is less than the threshold, the UE regards the packet to be sent as a small data packet, and sends the packet in a first data transmission manner; and when the data volume of the packet to be sent is greater than or equal to the threshold, the UE regards the packet to be sent as a large data packet, and sends the packet in a second data transmission manner. In this way, different data transmission manners are adopted for packets of different sizes, thereby solving problems caused by sending a small packet in a data transmission manner used for sending a large packet in the prior art, such as a resource waste, a relatively great transmission delay, and relatively low transmission efficiency.

Figure 6:
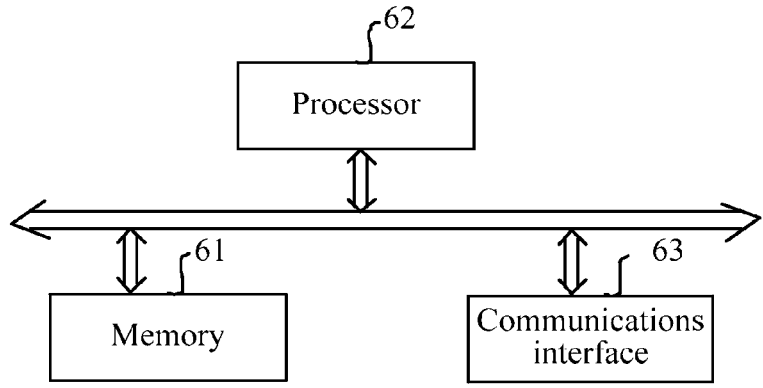
FIG. 6 is a schematic structural diagram of another UE according to an embodiment of the present invention.

FIG. 6 is a schematic structural diagram of another UE according to an embodiment of the present invention. As shown in FIG. 6, the UE includes: a memory 61, a processor 62, and a communications interface 63.

The memory 61 is configured to store a program. Specifically, the program may include program code, where the program code includes a computer operating instruction. The memory 61 may include a high-speed RAM memory, or may further include a non-volatile memory (non-volatile memory), for example, at least one disk memory.

The processor 62 is configured to execute the program stored in the memory 61.

The processor 62 may be a central processing unit (Central Processing Unit, CPU for short) or an application specific integrated circuit (Application Specific Integrated Circuit, ASIC for short), or is configured as one or more integrated circuits implementing the embodiment of the present invention.

The communications interface 63 is configured to receive a threshold, and when a data volume of a packet to be sent is less than the threshold, send the packet in a first data transmission manner; or when a data volume of the packet is greater than or equal to the threshold, send the packet in a second data transmission manner.

In an optional implementation manner, a multiplexing manner for a transmission resource used in the first data transmission manner and a transmission resource used in the second data transmission manner is frequency division multiplexing, time division multiplexing, time-frequency division multiplexing, or space division multiplexing.

In an optional implementation manner, a data format used in the first data transmission manner sequentially includes an information code word field, at least one OFDM symbol formed by the packet, and a GT, where the information code word field is used to indicate a start position of the at least one OFDM symbol.

Optionally, the information code word field includes a CP, where the CP is greater than or equal to a sum of the double of a propagation delay and a maximum multipath delay spread in a current transmission environment.

Optionally, the GT in the data format used in the first data transmission manner is greater than the double of the propagation delay in the current transmission environment.

In an optional implementation manner, if the multiplexing manner for the transmission resource used in the first data transmission manner and the transmission resource used in the second data transmission manner includes the frequency division multiplexing, a duration of the OFDM symbol in the data format used in the first data transmission manner is an integral multiple of a duration of an OFDM symbol in a data format used in the second data transmission manner.

In an optional implementation manner, that the communications interface 63 is configured to receive the threshold includes that: the communications interface 63 is specifically configured to receive the threshold which is sent by a network side device by using a first broadcast message, or receive the threshold which is sent by a network side device by using first dedicated signaling, or receive the threshold entered by an operator.

In an optional implementation manner, the communications interface 63 is further configured to: before sending the packet, receive a mapping which is between the transmission resources and the data transmission manners and is sent by the network side device by using a second broadcast message; or receive a mapping which is between the transmission resources and the data transmission manners and is sent by the network side device by using second dedicated signaling. Based on this, that the communications interface 63 is configured to: when the data volume of the packet is less than the threshold, send the packet in a first data transmission manner includes that: the communications interface 63 is specifically configured to: when the data volume of the packet is less than the threshold, determine, according to the mapping, the transmission resource corresponding to the first data transmission manner, and send the packet on the determined transmission resource in the first data transmission manner. Similarly, that the communications interface 63 is configured to: when the data volume of the packet is greater than or equal to the threshold, send the packet in the second data transmission manner includes that: the communications interface 63 is specifically configured to: when the data volume of the packet is greater than or equal to the threshold, determine, according to the mapping, the transmission resource corresponding to the second data transmission manner, and send the packet on the determined transmission resource in the second data transmission manner.

Optionally, in specific implementation, if the memory 61, the processor 62, and the communications interface 63 are implemented independently, the memory 61, the processor 62, and the communications interface 63 may be interconnected through buses and implement communication with each other. The buses may be Industry Standard Architecture (Industry Standard Architecture, ISA for short) buses, Peripheral peripheral component interconnect buses, Extended Industry Standard Architecture (Extended Industry Standard Architecture, EISA for short) buses, and the like. The buses may be classified into address buses, data buses, control buses, and the like. For ease of expression, the buses are expressed as only one bold line in FIG. 6, but it does mean that only one bus or one type of buses exist.

Optionally, in specific implementation, if the memory 61, the processor 62, and the communications interface 63 are integrated on one chip for implementation, the memory 61, the processor 62, and the communications interface 63 may implement communication with each other by using internal interfaces.

The UE provided in this embodiment may be configured to execute the processes of the method embodiment shown in FIG. 1. The specific working principle of the UE is not repeated. For details, refer to the description in the method embodiment.

When a UE provided in this embodiment needs to send a packet, the UE compares a data volume of the packet with a threshold, to determine whether the packet to be sent is a large data packet or a small data packet; when the data volume of the packet to be sent is less than the threshold, the UE regards the packet to be sent as a small data packet, and sends the packet in a first data transmission manner; and when the data volume of the packet to be sent is greater than or equal to the threshold, the UE regards the packet to be sent as a large data packet, and sends the packet in a second data transmission manner. In this way, different data transmission manners are adopted for packets of different sizes, thereby solving problems caused by sending a small packet in a data transmission manner used for sending a large packet in the prior art, such as a resource waste, a relatively great transmission delay, and relatively low transmission efficiency.

Figure 7:
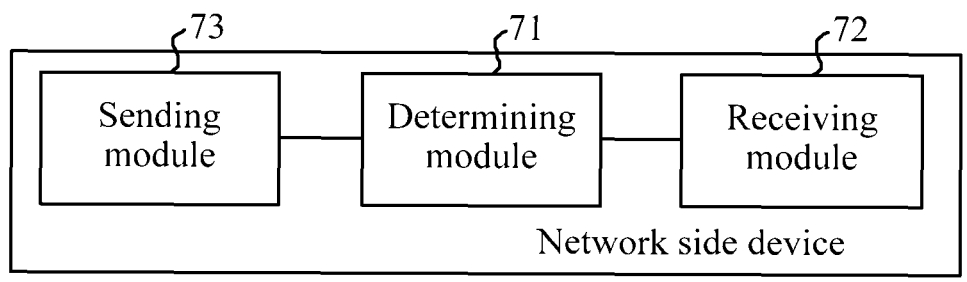
FIG. 7 is a schematic structural diagram of a network side device according to an embodiment of the present invention.

FIG. 7 is a schematic structural diagram of a network side device according to an embodiment of the present invention. As shown in FIG. 7, the network side device includes: a determining module 71 and a receiving processing module 72.

The determining module 71 is configured to determine a transmission resource for a packet that is sent by a UE and is detected.

The receiving processing module 72 is connected to the determining module 71, and is configured to: when a data transmission manner corresponding to the determined transmission resource is a first data transmission manner, receive the packet in the first data transmission manner; or when a data transmission manner corresponding to the determined transmission resource is a second data transmission manner, receive the packet in the second data transmission manner.

In an optional implementation manner, as shown in FIG. 7, the network side device further includes: a sending module 73.

The sending module 73 is connected to the determining module 71, and is configured to: before the determining module 71 determines the transmission resource for the packet that is sent by the UE and is detected, send the threshold to the UE by using a first broadcast message, or send the threshold to the UE by using first dedicated signaling, so that the UE determines, according to a value relationship between a data volume of the packet and the threshold, the data transmission manner used for sending the packet. Besides the foregoing manners, the threshold may also be set by a system, that is, the network side device and the UE agree, in advance, on a threshold to be used.

Optionally, the sending module 73 may be further configured to: before the determining module 71 determines the transmission resource for the packet that is sent by the UE and is detected, send a mapping between the transmission resources and the data transmission manners to the UE by using a second broadcast message or second dedicated signaling, so that the UE determines, according to the mapping, the transmission resource used for transmitting the packet.

In an optional implementation manner, the data transmission manners include the first data transmission manner and the second data transmission manner.

Optionally, the transmission resources used in the first data transmission manner and the second data transmission manner may be multiplexed. For example, a multiplexing manner for the transmission resource used in the first data transmission manner and the transmission resource used in the second data transmission manner is frequency division multiplexing, time division multiplexing, time-frequency division multiplexing, or space division multiplexing.

In the embodiment of the present invention, a data format used in the second data transmission manner is: CP+one OFDM symbol+GT, as shown in FIG. 2.

In the embodiment of the present invention, a data format used in the first data transmission manner sequentially includes an information code word field, at least one OFDM symbol formed by the packet to be sent, and a GT, as shown in FIG. 3, which may be expressed more directly as information code word field+data part+GT, where the data part is the at least one OFDM symbol formed by the packet to be sent, and the information code word field is used to indicate a start position of the data part (that is, the at least one OFDM symbol).

Optionally, the information code word field includes a CP, where the CP is greater than or equal to a sum of the double of a propagation delay and a maximum multipath delay spread in a current transmission environment. It can be seen that the CP in the data format used in the first data transmission manner is greater than or equal to the duration of the CP in the data format used in the second data transmission manner, and therefore, the CP in the data format used in the first data transmission manner may be referred to as a large CP.

Optionally, the GT in the data format used in the first data transmission manner is greater than the double of the propagation delay in the current transmission environment.

Optionally, if the multiplexing manner for the transmission resource used in the first data transmission manner and the transmission resource used in the second data transmission manner includes the frequency division multiplexing, for example, a frequency division multiplexing manner is adopted for the transmission resource used in the first data transmission manner and the transmission resource used in the second data transmission manner, or a time-frequency division multiplexing manner is adopted for the transmission resource used in the first data transmission manner and the transmission resource used in the second data transmission manner, a duration of the OFDM symbol in the data format used in the first data transmission manner is an integral multiple of a duration of the OFDM symbol in the data format used in the second data transmission manner.

The network side device provided in this embodiment may be a base station, but is not limited thereto.

The functional modules of the network side device provided in this embodiment may be configured to execute the processes of the method embodiment shown in FIG. 4. A specific working principle of the network side device is not repeated.

The network side device provided in this embodiment supports different data transmission manners, and distinguishes the different data transmission manners from each other by using different transmission resources used in the different data transmission manners. When a packet arrives, by determining a transmission resource for the packet that is detected, the network side device receives the packet in a data transmission manner corresponding to the transmission resource, so that different packets can be received in different data transmission manners. Compared with a solution of transmitting a small packet in a data transmission manner used for transmitting a large packet in the prior art, this solution helps to reduce a resource waste, reduce a transmission delay, and improve transmission efficiency.

Figure 8:
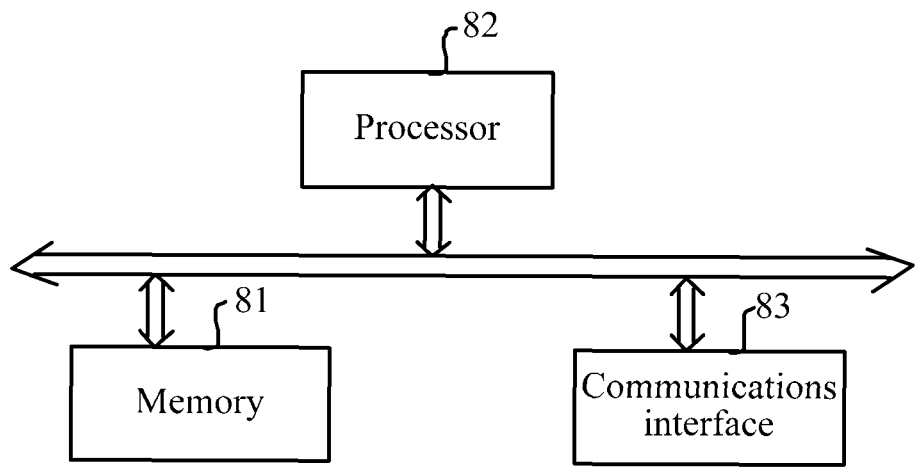
FIG. 8 is a schematic structural diagram of another network side device according to an embodiment of the present invention.

FIG. 8 is a schematic structural diagram of another network side device according to an embodiment of the present invention. As shown in FIG. 8, the network side device includes: a memory 81 and a processor 82.

The memory 81 is configured to store a program. Specifically, the program may include program code, where the program code includes a computer operating instruction. The memory 81 may include a high-speed RAM memory, or may further include a non-volatile memory (non-volatile memory), for example, at least one disk memory.

The processor 82 is configured to execute the program stored in the memory 81, so as to determine a transmission resource for a packet that is sent by a UE and is detected, and when a data transmission manner corresponding to the determined transmission resource is a first data transmission manner, receive the packet in the first data transmission manner; or when a data transmission manner corresponding to the determined transmission resource is a second data transmission manner, receive the packet in the second data transmission manner.

In an optional implementation manner, as shown in FIG. 8, the network side device further includes: a communications interface 83.

The communications interface 83 is configured to: before the processor 82 determines the transmission resource for the packet that is sent by the UE and is detected, send the threshold to the UE by using a first broadcast message, or send the threshold to the UE by using first dedicated signaling, so that the UE determines, according to a value relationship between a data volume of the packet and the threshold, the data transmission manner used for sending the packet. Besides the foregoing manners, the threshold may also be set by a system, that is, the network side device and the UE agree, in advance, on a threshold to be used.

Optionally, the communications interface 83 may be further configured to: before the processor 82 determines the transmission resource for the packet that is sent by the UE and is detected, send a mapping between the transmission resources and the data transmission manners to the UE by using a second broadcast message or second dedicated signaling, so that the UE determines, according to the mapping, the transmission resource used for transmitting the packet.

Optionally, the transmission resources used in the first data transmission manner and the second data transmission manner may be multiplexed. For example, a multiplexing manner for the transmission resource used in the first data transmission manner and the transmission resource used in the second data transmission manner is frequency division multiplexing, time division multiplexing, time-frequency division multiplexing, or space division multiplexing.

In the embodiment of the present invention, a data format used in the second data transmission manner is: CP+one OFDM symbol+GT, as shown in FIG. 2.

In the embodiment of the present invention, a data format used in the first data transmission manner sequentially includes an information code word field, at least one OFDM symbol formed by the packet to be sent, and a GT, as shown in FIG. 3, which may be expressed more directly as information code word field+data part+GT, where the data part is the at least one OFDM symbol formed by the packet to be sent, and the information code word field is used to indicate a start position of the data part (that is, the at least one OFDM symbol).

Optionally, the information code word field includes a CP, where the CP is greater than or equal to a sum of the double of a propagation delay and a maximum multipath delay spread in a current transmission environment. It can be seen that the CP in the data format used in the first data transmission manner is greater than or equal to the duration of the CP in the data format used in the second data transmission manner, and therefore, the CP in the data format used in the first data transmission manner may be referred to as a large CP.

Optionally, the GT in the data format used in the first data transmission manner is greater than the double of the propagation delay in the current transmission environment.

Optionally, if the multiplexing manner for the transmission resource used in the first data transmission manner and the transmission resource used in the second data transmission manner includes the frequency division multiplexing, for example, a frequency division multiplexing manner is adopted for the transmission resource used in the first data transmission manner and the transmission resource used in the second data transmission manner, or a time-frequency division multiplexing manner is adopted for the transmission resource used in the first data transmission manner and the transmission resource used in the second data transmission manner, a duration of the OFDM symbol in the data format used in the first data transmission manner is an integral multiple of a duration of the OFDM symbol in the data format used in the second data transmission manner.

The network side device provided in this embodiment may be a base station, but is not limited thereto.

The network side device provided in this embodiment may be configured to execute the processes of the method embodiment shown in FIG. 4. A specific working principle of the network side device is not repeated.

The network side device provided in this embodiment supports different data transmission manners, and distinguishes the different data transmission manners from each other by using different transmission resources used in the different data transmission manners. When a packet arrives, by determining a transmission resource for the packet that is detected, the network side device receives the packet in a data transmission manner corresponding to the transmission resource, so that different packets can be received in different data transmission manners. Compared with a solution of transmitting a small packet in a data transmission manner used for transmitting a large packet in the prior art, this solution helps to reduce a resource waste, reduce a transmission delay, and improve transmission efficiency.

A person of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage mediums include various mediums capable of storing program code, such as a ROM, a RAM, a magnetic disk, or an optical disc.

Finally, it should be noted that the foregoing embodiments are merely intended for describing the technical solutions of the present invention other than limiting the present invention. Although the present invention is described in detail with reference to the foregoing embodiments, a person of ordinary skill in the art should understand that they may still make modifications to the technical solutions described in the foregoing embodiments or make equivalent replacements to some or all the technical features thereof, without departing from the scope of the technical solutions of the embodiments of the present invention.

What is claimed is:

1. A data sending method comprising:
    receiving a threshold; and
    determining a transmission manner according to the threshold, wherein (a) if a data volume of a packet to be sent is less than the threshold, sending the packet in a first data transmission manner; and (b) if a data volume of the packet is greater than or equal to the threshold, sending the packet in a second data transmission manner,
    wherein the first and second transmission manners are different and a multiplexing manner for transmission resources used in the first and second data transmission manners is one of (a) frequency, (b) time, (c) time-frequency and (d) space division multiplexing,
    a data format of the first data transmission manner sequentially comprises an information code word field, at least one frequency-division multiplexing (OFDM) symbol formed by the packet, and a guard time (GT), wherein the information code word field indicates a start position of the at least one OFDM symbol, and
    the information code word field comprises a cyclic prefix (CP) greater than or equal to a sum of double a propagation delay and a maximum multipath delay spread in a current transmission environment.

2. The data sending method according to claim 1, wherein:
    the GT in the data format used in the first data transmission manner is greater than the double of the propagation delay in the current transmission environment.

3. A data receiving method comprising:
    transmitting a threshold to a user equipment;
    determining a transmission resource for a packet that is sent by the user equipment and is detected;
    if a data transmission manner corresponding to the determined transmission resource is a first data transmission manner, receiving the packet in the first data transmission manner; and
    if a data transmission manner corresponding to the determined transmission resource is a second data transmission manner, receiving the packet in the second data transmission manner,
    wherein the first and second transmission manners are different, and a multiplexing manner for the transmission resources used in the first and second data transmission manner is one of (a) frequency, (b) time, (c) time-frequency and (d) space division multiplexing,
    a data format used in the first data transmission manner sequentially comprises an information code word field, at least one frequency-division multiplexing (OFDM) symbol formed by the packet, and a guard time (GT), wherein the information code word field indicates a start position of the at least one OFDM symbol, and
    the information code word field comprises a cyclic prefix (CP) greater than or equal to a sum of double a propagation delay and a maximum multipath delay spread in a current transmission environment.

4. The data receiving method according to claim 3, wherein the transmitting, a threshold to a user equipment comprises:
    sending a threshold to the user equipment by using a first broadcast message, so that the user equipment determines, according to a value relationship between a data volume of the packet and the threshold, the data transmission manner used for sending the packet; or
    sending a threshold to the user equipment by using first dedicated signaling, so that the user equipment determines, according to a value relationship between a data volume of the packet and the threshold, the data transmission manner used for sending the packet.

5. The data receiving method according to claim 3, wherein before the determining a transmission resource for a packet that is sent by a user equipment and is detected, the method further comprises:
sending a mapping between the transmission resources and the data transmission manners to the user equipment by using a second broadcast message, so that the user equipment determines, according to the mapping, the transmission resource used for transmitting the packet; or
sending a mapping between the transmission resources and the data transmission manners to the user equipment by using second dedicated signaling, so that the user equipment determines, according to the mapping, the transmission resource used for transmitting the packet.

6. The data receiving method according to any one of claim 3, wherein a multiplexing manner for the transmission resource used in the first data transmission manner and the transmission resource used in the second data transmission manner is frequency division multiplexing, time division multiplexing, time-frequency division multiplexing, or space division multiplexing.

7. A user equipment comprising:
a memory, configured to store a program;
a processor, configured to execute the program; and
a communications interface, configured to receive a threshold, and (a) when a data volume of a packet to be sent is less than the threshold, send the packet in a first data transmission manner, or (b) when a data volume of the packet is greater than or equal to the threshold, send the packet in a second data transmission manner,
wherein the first and second transmission manners are different, and a multiplexing manner for transmission resources used in the first and second data transmission manners is one of (a) frequency, (b) time, (c) time-frequency and (d) space division multiplexing,
a data format used in the first data transmission manner sequentially comprises an information code word field, at least one frequency-division multiplexing (OFDM) symbol formed by the packet, and a guard time (GT), wherein the information code word field indicates a start position of the at least one OFDM symbol, and
the information code word field comprises a cyclic prefix (CP) greater than or equal to a sum of double a propagation delay and a maximum multipath delay spread in a current transmission environment.

8. A network side device comprising:
a transmitter configured to send a threshold to a user equipment;
a processor and memory storing instructions for execution by the processor so as to configure the processor to determine a transmission resource for a packet that is sent by the user equipment and is detected; and
a receiver configured to, (a) when a data transmission manner corresponding to the determined transmission resource is a first data transmission manner, receive the packet in the first data transmission manner, or (b) when a data transmission manner corresponding to the determined transmission resource is a second data transmission manner, receive the packet in the second data transmission manner,
wherein the first and second transmission manners are different and a multiplexing manner for transmission resources used in the first and second data transmission manners is one of (a) frequency, (b) time, (c) time-frequency and (d) space division multiplexing,
a data format of the first data transmission manner sequentially comprises an information code word field, at least one frequency-division multiplexing (OFDM) symbol formed by the packet, and a guard time (GT), wherein the information code word field indicates a start position of the at least one OFDM symbol, and
the information code word field comprises a cyclic prefix (CP) greater than or equal to a sum of double a propagation delay and a maximum multipath delay spread in a current transmission environment.

9. The network side device according to claim 8, wherein the transmitter, configured to send a threshold to a user equipment comprising:
before the processor determines the transmission resource for the packet that is sent by the user equipment and is detected, send the threshold to the user equipment by using a first broadcast message, or send the threshold to the user equipment by using first dedicated signaling, so that the user equipment determines, according to a value relationship between a data volume of the packet and the threshold, the data transmission manner used for sending the packet.

10. The network side device according to claim 9, wherein the transmitter is further configured to: before the processor determines the transmission resource for the packet that is sent by the user equipment and is detected, send a mapping between the transmission resources and the data transmission manners to the user equipment by using a second broadcast message or second dedicated signaling, so that the user equipment determines, according to the mapping, the transmission resource used for transmitting the packet.

* * * * *